US006623871B2

(12) United States Patent
Planche et al.

(10) Patent No.: US 6,623,871 B2
(45) Date of Patent: Sep. 23, 2003

(54) PROCESS FOR MANUFACTURING REPRODUCTION WITH A LUMINESCENCE EFFECT AND REPRODUCTION MANUFACTURED BY THE IMPLEMENTATION OF THE PROCESS

(75) Inventors: Patrick Planche, Vandoeuvres (CH); Francois Planche, Geneva (CH); Jacques-Charles Collet, Rivaz (CH)

(73) Assignee: Lumitech SA, MA (US)

( * ) Notice: Subject to any disclaimer, the term of this patent is extended or adjusted under 35 U.S.C. 154(b) by 15 days.

(21) Appl. No.: 09/877,489

(22) Filed: Jun. 8, 2001

(65) Prior Publication Data

US 2002/0004122 A1 Jan. 10, 2002

Related U.S. Application Data

(63) Continuation-in-part of application No. 08/973,592, filed on Apr. 16, 1998, now abandoned.

(30) Foreign Application Priority Data

Jun. 7, 1995 (FR) ........................................... 95 06721
Jun. 4, 1996 (WO) ................................ PCT/IB96/00556

(51) Int. Cl.[7] .......................... B32B 27/20; H05B 33/00

(52) U.S. Cl. ....................... 428/690; 428/195; 428/323; 428/917

(58) Field of Search ................................ 428/690, 917, 428/195, 323; 313/506; 430/47, 97; 283/107, 110, 112

(56) References Cited

U.S. PATENT DOCUMENTS

| | | | | | |
|---|---|---|---|---|---|
| 4,652,464 | A | * | 3/1987 | Ludlum et al. | 427/157 |
| 5,149,568 | A | * | 9/1992 | Beck | 428/14 |
| 5,257,785 | A | * | 11/1993 | Sugie | 273/157 R |
| 5,714,287 | A | * | 2/1998 | Malhotra | 430/47 |
| 6,071,855 | A | * | 6/2000 | Patton et al. | 503/227 |

FOREIGN PATENT DOCUMENTS

| | | | | |
|---|---|---|---|---|
| GB | 2147542 | A | * | 5/1985 |

* cited by examiner

*Primary Examiner*—Cynthia H. Kelly
*Assistant Examiner*—Dawn Garrett
(74) *Attorney, Agent, or Firm*—Pitney, Hardin, Kipp & Szuch LLP

(57) ABSTRACT

An image is reproduced on a transparent carrier and a film incorporating a photoluminescent product is applied to the carrier, either on the same side as the printed image or on the other. A filter in the form of a film allowing the effects of the color of the photoluminescent material to be moderated is inserted between the carrier and the film. The filter is a translucent material that desaturates the color of the luminescent layer by way of its light scattering capability. Light which passes through the filter is scattered uniformly thereby giving rise to a white haze, is then reflected off of the luminescent layer and then passes through filter again on its way to the eye of the viewer. Different sequences and combinations of the various layers are possible.

2 Claims, 1 Drawing Sheet

PROCESS FOR MANUFACTURING REPRODUCTION WITH A LUMINESCENCE EFFECT AND REPRODUCTION MANUFACTURED BY THE IMPLEMENTATION OF THE PROCESS

This application is a continuation-in-part of application Ser. No. 08/973,592, filed on Apr. 16, 1998, now abandoned.

BACKGROUND OF THE INVENTION

1. Field of the Invention

The present invention relates to a process for manufacturing a reproduction with a luminescence effect, and to such a reproduction.

2. Background of the Invention

It is currently known to make reproductions with a luminescence effect and more specifically a photoluminescence effect of the positive or negative Chinese-shadow image type or images produced using colored photoluminescent pigments. These two types of images having a luminescent effect are essentially produced using the following processes:

by screen printing and optionally offset printing with photoluminescent inks which are colored or not on various carriers, such as paper, fabric, plastic or metal;

by various forms of printing (screen, "pressure-pad", offset, heat-transfer printing, etc.) on photoluminescent carriers by means of non-photoluminescent inks; and by superposition of a carrier which is opaque or non-opaque, colored or noncolored, perforated and/or rendered opaque at chosen places allowing the luminescence of a second luminescent carrier to appear at the perforated places and/or at the transparent places.

These various processes do not make it possible to produce reproductions having a very high resolution and very sharp images, which may be seen quite faithfully at night as they are during the day. These are often rather simple, geometrical drawings with few details and few colors. In addition, the colored photoluminescent pigments offer only a limited number of colors and their luminescence characteristics, both in terms of brightness and in duration, are limited. In all these reproductions, one element which has a strong negative impact on the rendition of the image is the color of the luminescent product, which is often yellow.

OBJECTS AND SUMMARY OF THE INVENTION

The object of the present invention is to make it possible to produce, as a reproduction with a luminescence effect, all types of images such as photographic images, technical drawings, artists' works, artificial images, logos, texts, wood-, stone-, metal-, fabric-, liquid-, plant-texture effects, or any other extra effects. These reproductions are produced with a very high quality of detail, of sharpness, of contrast and of colors, while allowing the luminescent image to be very bright and to last longer than that of the current state of the art.

The process according to the invention is characterized by the fact that the following steps are carried out:

a. a film comprising a luminescent material is prepared;

b. a translucent filter is prepared in order to form a cohesive interface between the luminescent material and a surface provided with an image and to moderate the influence of the color of the luminescent material on the rendition of the reproduction; and C. an image is printed on at least one surface allowing light to pass through it, ensuring that it is transparent.

The advantage of the process according to the invention is that it makes it possible to print any type of image while maintaining its quality, i.e. its shades, its colors and its details, whether the printing is continuous-tone printing, for example laser printing, or positive or negative photographic printing, in order to obtain a photographic quality, or very fine halftone printing, for example offset printing, or full-color area printing, for example screen printing. The condition is that this printing be transparent and produced on one or more surfaces allowing light to pass through them so that the luminescent material can be reached by the light in order to store the light energy optimally, when it is a photoluminescent material, and above all to allow said energy to be regenerated by the light emission from the product through the reproduction and said surfaces. The luminescent material is, of course, preferably photoluminescent, but other materials which may be charged by other forms of energy, such as electrical energy, may be used. If the luminescent product has a color which impairs the quality of the reproduction, a suitable translucent filter must be provided. This filter may either be a film placed over the film with the luminescent product or be incorporated directly into the film with the luminescent material.

According to another embodiment, provision is made to print the image on the filter using known means, for example heat transfer, offset, screen-printing, etc.

According to another embodiment, the image is printed directly on the film with the luminescent material incorporating the filter, the surface on which the image is printed always being a surface allowing light to pass the though it.

According to another embodiment, the image is printed on a transparent carrier which is then affixed to the film comprising the luminescent material and to which the filter is affixed.

According to another embodiment, the image is also printed on a transparent carrier which is affixed to the film comprising the luminescent material and the filter.

According to another embodiment, for the purpose of optimizing the light emission from the luminescent material, a backscattering film is applied to the back of the film incorporating the luminescent product.

According to another embodiment, the image or parts of the image which are juxtaposed or superposed is/are printed on two different surfaces allowing light to pass through them, thus making it possible to obtain a depth effect and, where appropriate, a relief effect.

This is because it is possible, in the simplest case, to print the entire image or parts on two faces of a transparent carrier which is then affixed to the film with the luminescent material, the filter having been affixed beforehand to said film or incorporated into the luminescent material.

It is also possible to print part of the image, for example the background, on the filter and the other on a transparent carrier, or else to print part of the image on the film comprising the luminescent material and the filter and a transparent carrier. In the latter case, the transparent carrier could also be printed on both faces, completely or partially, thus creating a relief effect in addition to a depth effect. If superposed parts of the image are printed on different surfaces and in different colors depending on the angle of observation, the superposition of the colors will also modify the color of the reproduction.

The invention also relates to reproductions obtained by the implementation of the process according to the invention.

Thus, a reproduction with a luminescence effect is characterized by the fact that it is composed of a film comprising a luminescent material, of a translucent filter and of an image printed on at least one surface allowing light to pass through it.

According to another variant, the image printed completely or in juxtaposed and/or superposed parts on two different surfaces allowing light to pass through them, thus making it possible to create a depth effect and, where appropriate, a relief effect.

Finally, the reproduction may comprise a simple transparent protective screen, in particular a screen for protection against ultraviolet radiation.

BRIEF DESCRIPTION OF THE DRAWINGS

The invention will be described in more detail by means of the appended drawing.

DETAILED DESCRIPTION OF THE PREFERRED EMBODIMENTS

Figure 1:
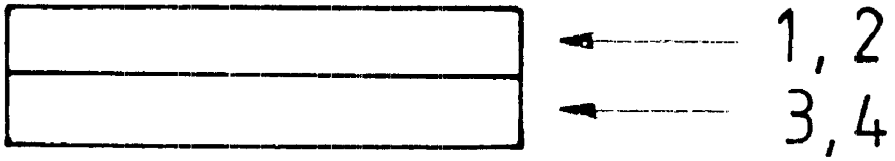
FIG. 1 is a diagrammatic sectional view of a reproduction according to one embodiment.

In the simplest embodiment of the invention, an image 2 is reproduced on a transparent carrier 1 and a film 4 incorporating a luminescent, and more especially a photoluminescent, product is applied to the carrier 1, either on the same side as the printed image or on the other. A filter 3 in the form of a film allowing the effects of the color of the photoluminescent material to be moderated is inserted between the carrier 1 and the film 4.

More precisely, filter 3 is a translucent material that desaturates the color of the luminescent layer by way of its light scattering capability. Desaturation of color is equivalent to the adding of white to a color thereby making the color less intense. Light which passes through the filter 3 is scattered uniformly thereby giving rise to a white haze, is then reflected off of the luminescent layer 4 and then passes through filter 3 again on its way to the eye of the viewer. Additional scattering of the light occurs during this second pass as well, reinforcing the white color rather than the yellow color of the luminescent layer 4. Preferably, filter 3 includes very precisely controlled air bubbles, typically in the diameter range 0.2–5.0 microns, to perform this light scattering. The air bubbles are typically initially formed as beads filled with water, but after the layer is coated and as the layer dries, the water is driven out of the beads leaving discrete encapsulated air voids uniformly dispersed throughout the dry film. In this case, there is no pigment in the filter 3 and nothing to absorb light. However, the uniformity of the air bubbles gives rise to the effective scattering, and hence the ability to mask the underlying color of the luminescent layer. Alternatively, white layers which are pigmented with $TiO_2$ (titanium dioxide) can be used as filter 3. However, this alternative embodiment may result in reduced brightness of the image.

Filter 3 and the associated configuration thereby allows pictures to be printed on essentially a white background rather than a yellow one, making the colors appear as they would if they were printed on a white piece of paper rather than a yellow one.

According to another embodiment, the filter 3 may be incorporated directly into the film 4 with the photoluminescent product.

Finally, in an even more elaborate embodiment, a backscattering film 5 is applied to the back of the film 4 with the photoluminescent product so as to allow the "photoluminous" emission to be optimized by backscattering of the luminescence of the product of the photoluminescent material, the filter being either affixed to the luminescent material or incorporated into said material.

We will now move on to review elements used for realizing the invention.

The carrier 1 must have excellent transparency so as to allow, in an optimum manner, on the one hand, daylight and/or artificial light to pass through it, allowing the photoluminescent material to store the energy, and, on the other hand, to allow light emission from the photoluminescent product.

The carrier may be smooth or textured, glossy or matt, and tinted or not. Various materials may be used, in particular polypropylene and polyester. One of the factors which has to be taken into account in the choice of material is the ability of the material to protect against UV radiation and its compatibility with the other components of the reproduction. This protection and compatibility will guarantee good and lasting stability of the reproduction with regard to its sharpness, details, colors, etc.

The filing company has produced good reproductions using carriers whose thickness is between 80 and 120 microns.

The reproduction 2, i.e. the printed image, must have good transparency so as to allow light to pass through it, in an optimum manner, in both directions.

Various printing techniques are used, such as printing, ink-jet printing, offset printing, photographic printing (for example diapositives), etc. The method of printing will be chosen depending on the possible transparency properties of the inks, on the quality of the printing and on the compatibility with the other components of the photoluminous reproduction.

The filing company has obtained excellent reproductions when the thickness of the printing was less than 10 microns.

It is obvious that what determines transparency is not just the thickness of the printing by itself but also the quality of the inks used and the resolution of the printing.

As mentioned previously, a filter 3, which is colored to a greater or lesser extent and has excellent translucency, must be created in order to moderate and correct the effects of the color of the luminescent material on the rendition of the reproduction. This filter must have excellent translucency in order not to impair the sharpness, contrast and shades of color of the reproduction during reflection of daylight and/or artificial light and of the photoluminous emission, i.e. it must contribute to obtaining as faithful an image as possible. The translucency of the filter is also necessary in order to maintain the luminescence performance characteristics of the photoluminous reproduction to the maximum.

Depending on the type of printing used and the result desired, the image may be printed directly on the filter, for example by heat transfer or offset or screen printing, or on the film incorporating the luminescent material and the filter. What is important is for the surface on which the image will be printed to be perfectly homogeneous and smooth and to allow light to pass through it, even if only to allow the emission radiation from the luminescent material. Thus, the filter affixed to the luminescent material creates a translucent surface ready to receive any type of direct printing or the carrier on which the image has been printed or a protective screen. The filter is a cohesive interface between the luminescent material and one of the abovementioned elements for a faithful rendition of the image and the moderation of the color of the luminescent material.

Various techniques for creating the filter may be envisaged, such as the application of a thin film or the insertion of the filter directly into the luminescent material.

The choice of filter manufacture, the choice of material, the choice of concentration level and the choice of thickness will be defined depending on the images and results which are desired and on both the reflection effect obtained during daytime and the luminescence effect obtained at night.

The film comprising the luminescent, and more specifically the photoluminescent, material 4 must in a general way be prepared so that the characteristics of the luminescent pigment are not impaired so as to guarantee a product having a luminous intensity, a duration of luminescence and a stability over time which are optimum.

The layer of luminescent product may be obtained in particular by the application of a luminescent film or the use of luminescent sheets. However, the application of a luminescent film together with good prior preparation of the luminescent material using the means known to those skilled in the art is often the best solution. This is because the latter solution makes it possible to obtain very good luminescent results, to vary the intensity characteristics and durability of the luminescence properties of the luminous layers in a very precise and rational way and to vary the flexibility or rigidity characteristics of the luminescent layers, as well as those of the reproductions having a luminescent effect, in a very rational and precise way.

A luminescent reproduction is thus obtained which is reliable both with regard to its image quality, i.e. the depth of field, shades, details, etc., and of its stability, i.e. the absence of deformation or degradation. Thus, this embodiment also makes it possible greatly to reduce the problems of mechanical stresses, i.e. the contraction and expansion during the heat shocks which the product may experience.

In addition, the advantage of using a film containing the luminescent material instead of a sheet is its precise adjustment to the format necessary for the reproduction, thus minimizing losses and scrap as much as possible.

Finally, the backscattering film 5 must be applied to the back of the luminescent product. Ideally, the backscattering film is a mirror or is white-colored, homogeneous and as opaque as possible. This makes it possible to optimize the light emission by backscattering of the luminescence of the luminescent material through the various layers lying above the luminescent material.

The backscattering film may be obtained in various ways known to those skilled in the art, such as applying a film or printing a film.

In some cases, the use of a rigid, mirror or white-colored film offers the advantage of stiffening the luminescent reproduction.

According to the invention, one embodiment which has proved to be of good quality consists in making a reproduction 2 having a luminescent effect by printing the image using the laser technique, said reproduction 2 being fastened to the internal face of the transparent carrier 1. The application of a filter in the form of a thin film between 50 and 150 microns thick to the internal face of the carrier is also fastened using the thermofusion (hot-melt) technique and by applying a luminescent product in the form of a film approximately 300 microns thick to the external face of the filter, also fastened by thermofusion. Finally, a backscattering film is applied by screen printing in opaque white on the external face of the photoluminescent product. As described above, the invention makes it possible to produce a good photoluminous reproduction both in terms of the diversity and of the quality of images.

It should be pointed out that if a reproduction having a luminescent effect with a smooth and glossy appearance is desired, a glossy transparent carrier must be used. If a smooth and matt appearance is desired, a matt transparent carrier must be used. If a reproduction having a luminescent effect with a relief appearance is desired, the printing of the reproduction must be done on the external face of the transparent carrier, while the filter and the luminescent material and, where appropriate, the backscattering film are placed on the other face of the carrier.

It is also possible to obtain a relief effect by using a transparent carrier having a relief on the external face, the image being printed on another surface allowing light to pass through it, for example, the other face of said carrier and/or the filter or, if the filter is incorporated into the luminescent material, with partial or complete printing on the film 4.

Without departing from the scope of the present invention, various combinations are possible in order to obtain desired effects. Thus, the image may be printed as required, completely or partially on one or more different surfaces, such as the two surfaces of a transparent carrier, the filter or the film with the luminescent material incorporating the filter. The printing may be done in a direct manner (offset, laser, or in an screen, "pressure-pad" printing, etc.) indirect manner (heat transfer printing).

Glossy or matt appearances are obtained by using the appropriate transparent carrier.

In the examples illustrated in the appended figures, various alternative embodiments for creating luminescent reproductions have been shown diagrammatically. Thus it is possible to use completely independent carriers for each of the elements (see FIG. 2), i.e. a transparent carrier 1, a reproduction 2, a filter 3 and a luminescent product 4 and/or to integrate a few of these elements, as in FIG. 1. The carrier and the image 2 are combined in the same element, while the filter and the luminescent product 4 are combined in another element.

Figure 2:
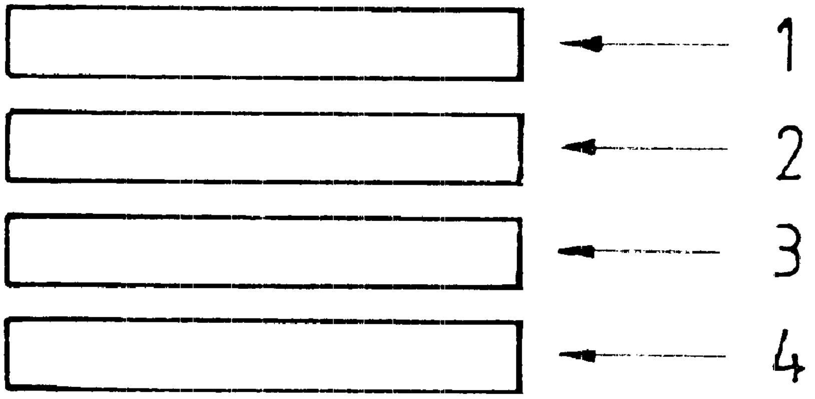
FIG. 2 is a diagrammatic section of a reproduction according to another embodiment.
Figure 3:
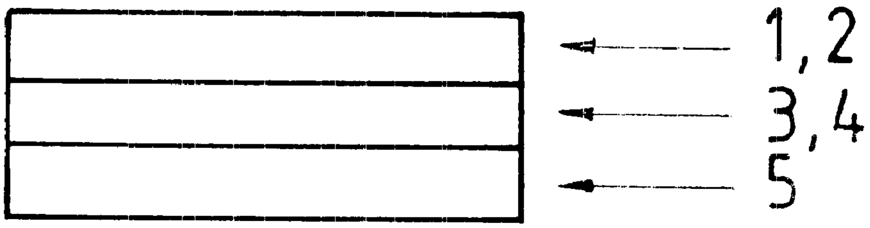
FIG. 3 is a diagrammatic section of a reproduction according to another embodiment.

Finally, the embodiment in FIG. 3 is similar to that in FIG. 1, except that a third element, namely a backscattering film 5, is also provided.

Reproductions having a luminescent effect may be produced on both sides, without departing from the scope of the present invention, either by producing, according to the invention, two reproductions which are joined back to back or by using a luminescent film common to the two films, thus making it possible to save on material, and rationalizing the production.

The reproductions having a luminescent effect thus produced may be used in fields which are as numerous as they are varied, for example in advertising, watchmaking, jewelry, tourism, games, etc. The reproduction may be packaged in a multitude of forms, for example as key rings, badges, teeshirts, helmets, watch dials, frames, bracelets, etc.

What is claimed is:

1. A film comprising the following layers:

a luminescent layer including a luminescent pigment emitting luminescent light;

a filter layer through which light can pass, said filter layer scattering colors of said luminescent pigment and said luminescent light thereby desaturating colors of said luminescent pigment and said luminescent light toward white color; and an image-receiving layer, said image-receiving layer receiving an image through which light can pass.

2. A film comprising the following layers:

a luminescent layer including a luminescent pigment emitting luminescent light;

a filter layer through which light can pass, said filter material scattering colors of said luminescent pigment and said luminescent light thereby desaturating colors of said luminescent pigment and said luminescent light toward white color; and a transparent layer which receives an image on a top or bottom thereof through which light can pass.

* * * * *